US010151358B2

United States Patent
Itagaki et al.

(10) Patent No.: US 10,151,358 B2
(45) Date of Patent: Dec. 11, 2018

(54) SELECTABLE ONE-WAY CLUTCH

(71) Applicant: TOYOTA JIDOSHA KABUSHIKI KAISHA, Toyota-shi, Aichi-ken (JP)

(72) Inventors: Kenji Itagaki, Shizuoka-ken (JP); Naofumi Magarida, Shizuoka-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 419 days.

(21) Appl. No.: 15/085,339

(22) Filed: Mar. 30, 2016

(65) Prior Publication Data

US 2016/0290415 A1 Oct. 6, 2016

(30) Foreign Application Priority Data

Apr. 1, 2015 (JP) .................................. 2015-075284
Jul. 1, 2015 (JP) .................................. 2015-132774

(51) Int. Cl.
*F16D 41/12* (2006.01)
*F16D 41/14* (2006.01)
*F16D 28/00* (2006.01)
*F16H 3/44* (2006.01)
(Continued)

(52) U.S. Cl.
CPC ............ *F16D 41/125* (2013.01); *F16D 41/14* (2013.01); *F16H 3/44* (2013.01); *F16D 28/00* (2013.01); *F16H 3/728* (2013.01); *F16H 2037/0873* (2013.01); *F16H 2200/2007* (2013.01); *F16H 2200/2033* (2013.01); *F16H 2200/2079* (2013.01); *F16H 2200/2082* (2013.01)

(58) Field of Classification Search
CPC ........ F16D 41/125; F16D 41/14; F16D 28/00; F16H 2200/2082; F16H 2200/2033; F16H 2200/2079; F16H 3/44; F16H 2037/0873; F16H 3/728
See application file for complete search history.

(56) References Cited

U.S. PATENT DOCUMENTS

| | | | |
|---|---|---|---|
| 9,611,905 B2* | 4/2017 | Yasui | ...................... F16D 47/04 |
| 2011/0183806 A1* | 7/2011 | Wittkopp | ................ F16D 7/028 |
| | | | 475/263 |
| 2016/0160942 A1 | 6/2016 | Shioiri et al. | |

FOREIGN PATENT DOCUMENTS

| | | |
|---|---|---|
| JP | 2002-514292 A | 5/2002 |
| JP | 2004-538427 A | 12/2004 |
| JP | 2008-008439 A | 1/2008 |

(Continued)

*Primary Examiner* — Jacob S. Scott
*Assistant Examiner* — Lillian T Nguyen
(74) *Attorney, Agent, or Firm* — Hunton Andrews Kurth LLP

(57) ABSTRACT

A selectable one-way clutch includes a first plate, a second plate, a claw, a selector plate and an interposition member. The claw is provided in the first plate. The claw projects from the first plate toward the second plate. The claw meshes with a recessed portion disposed in the second plate when the second plate rotates in a predetermined rotation direction and the claw projects from the first plate. The selector plate is placed so as to be adjacent to the first plate. The selector plate rotates relative to the first plate between a locked position at which the claw is projectable and a released position at which the claw is maintained. The interposition member is placed between the selector plate and the second plate. Rotation of the interposition member relative to the selector plate is restricted.

3 Claims, 10 Drawing Sheets

(51) Int. Cl.
 *F16H 3/72* (2006.01)
 *F16H 37/08* (2006.01)

(56) References Cited

FOREIGN PATENT DOCUMENTS

| | | |
|---|---|---|
| JP | 2008-014333 A | 1/2008 |
| JP | 20120517566 A | 8/2012 |
| JP | 2016-109254 A | 6/2016 |
| WO | 98/49456 A1 | 11/1998 |
| WO | 2010090958 A1 | 8/2010 |

* cited by examiner

SELECTABLE ONE-WAY CLUTCH

INCORPORATION BY REFERENCE

The disclosure of Japanese Patent Application Nos. 2015-075284 filed on Apr. 1, 2015 and 2015-132774 filed on Jul. 1, 2015, including the specification, drawings and abstract, is incorporated herein by reference in its entirety.

BACKGROUND

1. Technical Field

The disclosure relates to a selectable one-way clutch.

2. Description of Related Art

Japanese Patent Application Publication No. 2002-514292 (JP 2002-514292 A) describes a selectable one-way clutch configured such that a plate including a claw member provided in a projectable manner and a plate including a recessed portion with which the claw member meshes are provided on the same axis, and a state of the claw member is changed by a selector plate provided between two plates so as to select a lock mode and a release mode. The lock mode is a mode in which torque transmission between the two plates is allowed only at the time of a rotation in predetermined one direction. The release mode is a mode in which torque transmission between the two plates is blocked at the time of rotations in both directions. The selectable one-way clutch of JP 2002-514292 A switches between the lock mode and the release mode by rotating the selector plate.

SUMMARY

In the above configuration, in a case where the selectable one-way clutch is under an environment in which the selectable one-way clutch is wet by gear oil, the selectable one-way clutch may be affected by a viscosity of gear oil provided between the plate including the recessed portion and the selector plate. Particularly, in a case where a temperature of the gear oil is low, the viscosity of the gear oil becomes higher, so the selectable one-way clutch is easy to be affected by the viscosity. If the viscosity of the gear oil becomes higher, a shearing force of the gear oil provided between the plate including the recessed portion and the selector plate increases. Therefore, a torque that acts on the selector plate due to the rotation of the plate exceeds a torque that maintains the selector plate in the release mode, so that the selector plate rotates unexpectedly and causes a malfunction to switch the release mode to the lock mode.

The disclosure provides a selectable one-way clutch that is able to restrain an occurrence of a malfunction to rotate a selector plate unexpectedly.

An aspect example of the disclosure provides a selectable one-way clutch includes a first plate, a second plate, a claw, a selector plate and an interposition member. The second plate placed on the same axis as the first plate. The claw is provided in the first plate. The claw is configured to project from the first plate toward the second plate. The claw is configured to mesh with a recessed portion disposed in the second plate when the second plate rotates in a predetermined rotation direction and the claw projects from the first plate. The selector plate is placed so as to be adjacent to the first plate. The selector plate is configured to rotate relative to the first plate between a locked position at which the claw is projectable from the first plate and a released position at which the claw is maintained to be accommodated on a first-plate side. The interposition member is placed between the selector plate and the second plate. Rotation of the interposition member relative to the selector plate is restricted.

According to the above configuration, the interposition member provided in a state where a relative rotation to the selector plate is restricted is placed between the selector plate and the second plate. Due to the interposition member, the facing area between the selector plate and the second plate is decreased. On that account, it is possible to reduce an influence of viscosity of gear oil even under an environment in which the selectable one-way clutch is wet by the gear oil. That is, in comparison with a case where no interposition member is provided, a torque that acts on the selector plate due to a rotation of the second plate is decreased. Hereby, an occurrence of a malfunction in which the selector plate rotates unexpectedly can be restrained.

In the selectable one-way clutch, the selector plate may have a through hole. The through hole may be provided so as to allow the claw to pass through the through hole when the selector plate is placed at the locked position. The interposition member may be an additional plate. The additional plate may have an opening. The opening may be opened at a position corresponding to the through hole such that the claw is allowed to pass through the opening when the selector plate is placed at the locked position. According to the above configuration, a range where the second plate and the selector plate are prevented by the additional plate from facing each other can be increased to a limit that does not cause any troubles to operations of claw members. This makes it possible to further reduce the influence of the viscosity of the gear oil.

Another aspect example of the disclosure provides a power transmission device includes a planet gear mechanism, a selectable one-way clutch and a case. The planet gear mechanism includes at least three rotating elements. The selectable one-way clutch includes a first plate, a second plate, a claw, a selector plate and an interposition member. The second plate is placed on the same axis as the first plate. The claw is provided in the first plate. The claw is configured to project from the first plate toward the second plate. The claw is configured to mesh with a recessed portion disposed in the second plate when the second plate rotates in a predetermined rotation direction and the claw projects from the first plate. The selector plate is placed so as to be adjacent to the first plate. The selector plate is configured to rotate relative to the first plate between a locked position at which the claw is projectable from the first plate and a released position at which the claw is maintained to be accommodated on a first-plate side. The interposition member placed between the selector plate and the second plate. Rotation of the interposition member relative to the selector plate is restricted. The case is configured such that gear oil is supplied to inside of the case. The case accommodates the selectable one-way clutch. The first plate is fixed to the case. The at least one of the three rotating elements of the planet gear mechanism is connected to the second plate such that the at least one of the three rotating elements rotates integrally with the second plate. According to the above configuration, the selectable one-way clutch can switch an operation mode between a mode in which any one rotating element among three rotating elements of the planet gear mechanism is fixed to the case and a mode in which the rotating element is released. Further, even in a case where the mode in which the rotating element is released is maintained under a condition where the temperature of the gear oil is low, the influence of the viscosity of the gear oil is decreased due to the interposition member. Accordingly, it is possible to restrain a malfunction in which the selector plate rotates unexpectedly to be switched to the mode in which the rotating element is fixed to the case.

According to the selectable one-way clutch, the facing area between the selector plate and the second plate is decreased due to the interposition member. On that account, it is possible to reduce the influence of the viscosity of the gear oil even under an environment in which the selectable one-way clutch is wet by the gear oil. Hereby, the occurrence of the malfunction in which the selector plate rotates unexpectedly can be restrained.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
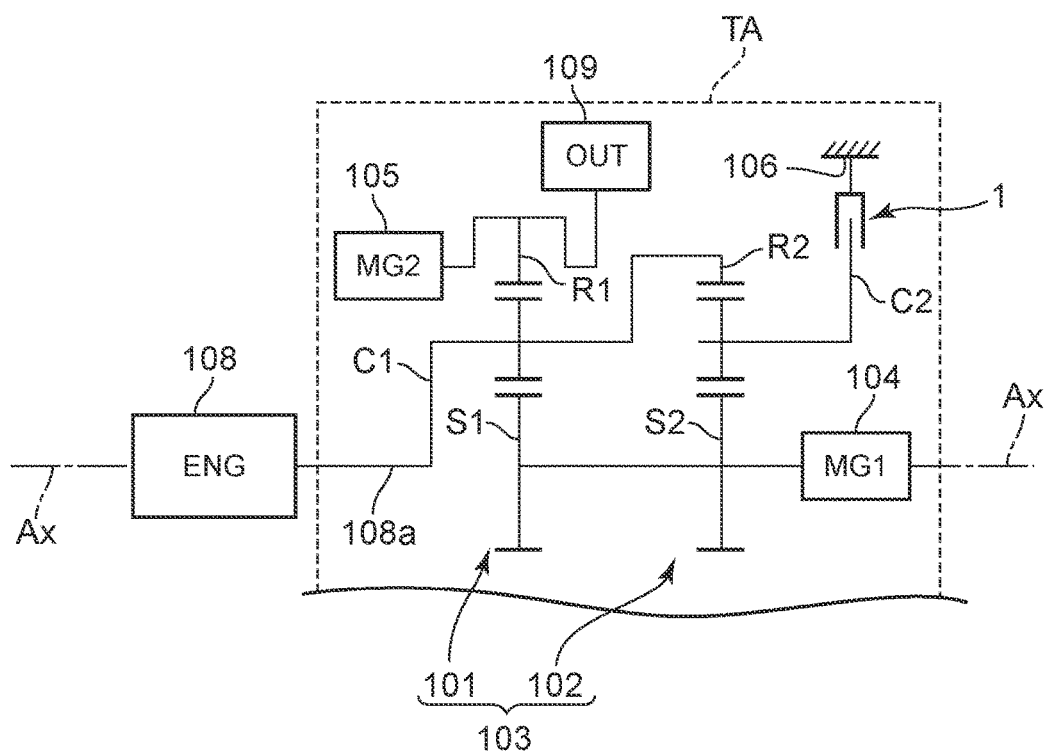
FIG. 1 is a view illustrating a use example in which a selectable one-way clutch according to an embodiment.

With reference to the drawings, the following describes an embodiment. As illustrated in FIG. 1, a selectable one-way clutch (hereinafter referred to as the clutch) 1 is used by being incorporated in a hybrid transformer axle (hereinafter referred to as the transaxle) TA provided in a hybrid vehicle. The transaxle TA as a power transmission device includes a power distribution mechanism 103 in which two single-pinion planet gear mechanisms 101, 102 are combined, two motor generators 104, 105, and a case 106 in which to accommodate the power distribution mechanism 103, the motor generators 104, 105, and other transfer elements.

The power distribution mechanism 103 is configured such that a sun gear S1 of the first planet gear mechanism 101 is coupled with a sun gear S2 of the second planet gear mechanism 102, and a carrier C1 of the first planet gear mechanism 101 is coupled with a ring gear R2 of the second planet gear mechanism 102. Hereby, the power distribution mechanism 103 includes four rotating elements that rotate differentially. A crankshaft 108a of an internal combustion engine 108 is coupled with the carrier C1 of the first planet gear mechanism 101. The first motor generator 104 is coupled with the sun gear S1 of the first planet gear mechanism 101 and the sun gear S2 of the second planet gear mechanism 102, and the second motor generator 105 is coupled with a ring gear R1 of the first planet gear mechanism 101. An output portion 109 for outputting a torque to driving wheels (not shown) is coupled with the ring gear R1.

Figure 2:
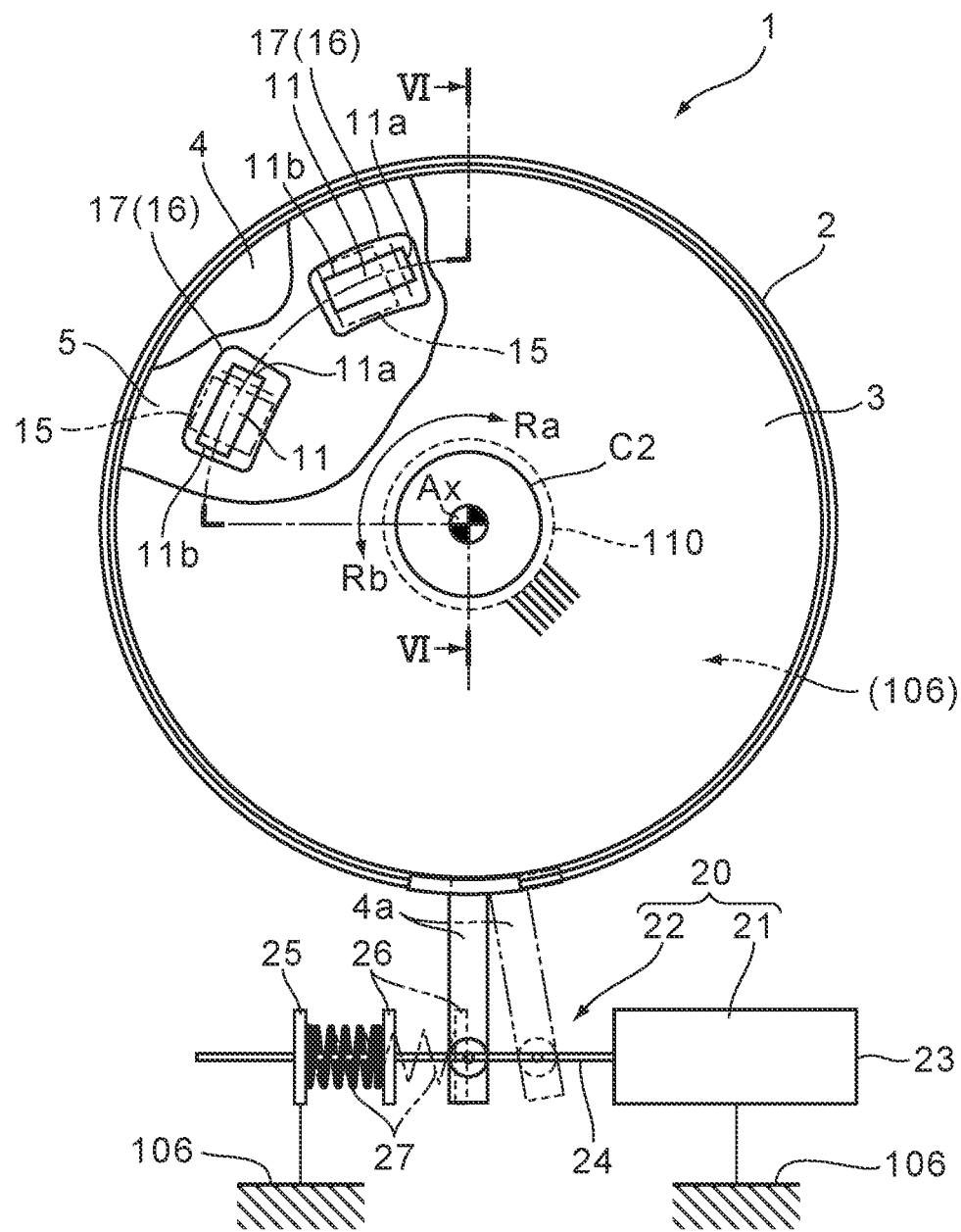
FIG. 2 is a view illustrating the selectable one-way clutch of FIG. 1.

The clutch 1 functions as a brake provided between the carrier C2, which is one rotating element of the power distribution mechanism 103, and the case 106. As illustrated in FIG. 2, the clutch 1 can select an operational mode between a lock mode and a release mode. The lock mode is a mode to switch the following state: a state where torque transmission from the carrier C2 to the case 106 is permitted at the time when a rotation direction of the carrier C2 is Ra, so as to fix the carrier C2; and a state where the torque transmission is blocked at the time when the rotation direction is Rb opposite to the above, so as to release the carrier C2. The release mode is a mode in which, regardless of whether the rotation direction of the carrier C2 is Ra or Rb, torque transmission from the carrier C2 to the case 106 is blocked so as to maintain a state where the carrier C2 is released.

Figure 3:
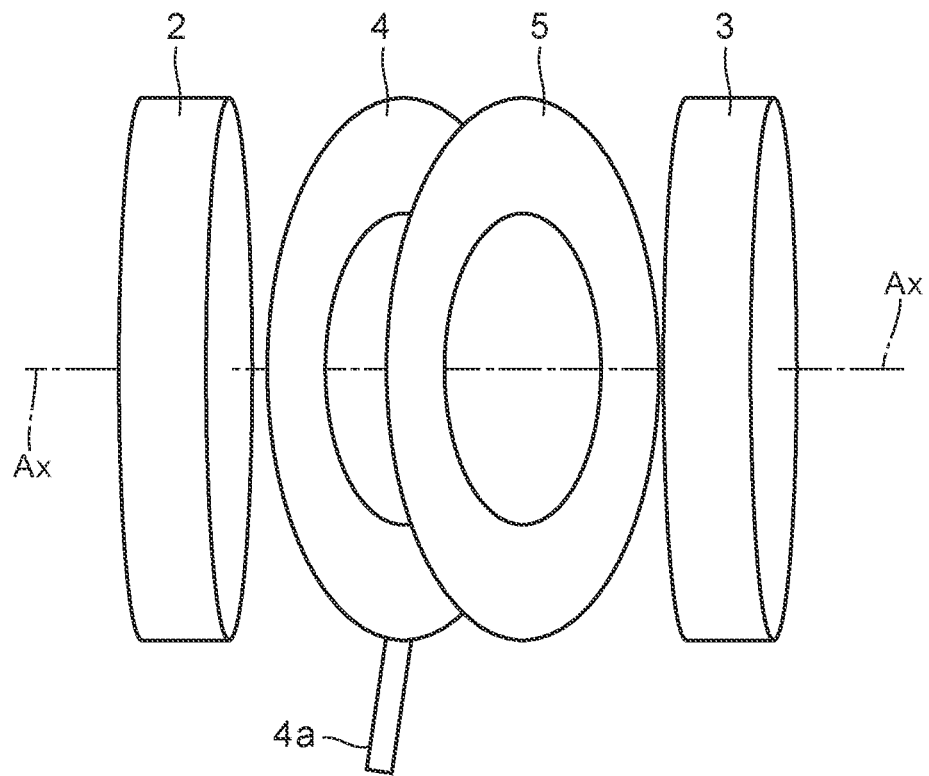
FIG. 3 is a view schematically illustrating constituents of the selectable one-way clutch.

As illustrated in FIGS. 2 and 3, the clutch 1 includes a holding plate 2 provided in a fixed shaft 110 fixed to the case 106 in a non-rotatable manner around an axis Ax, a rotating plate 3 provided so as to be integrally rotatable with the carrier C2 around the axis Ax, a selector plate 4 placed between the holding plate 2 and the rotating plate 3 so as to be rotatable around the axis Ax, and an additional plate 5 as an interposition member placed between the rotating plate 3 and the selector plate 4 and fixed to the case 106. The holding plate 2 is one example of a first plate, and the rotating plate 3 is one example of a second plate.

Figure 4:
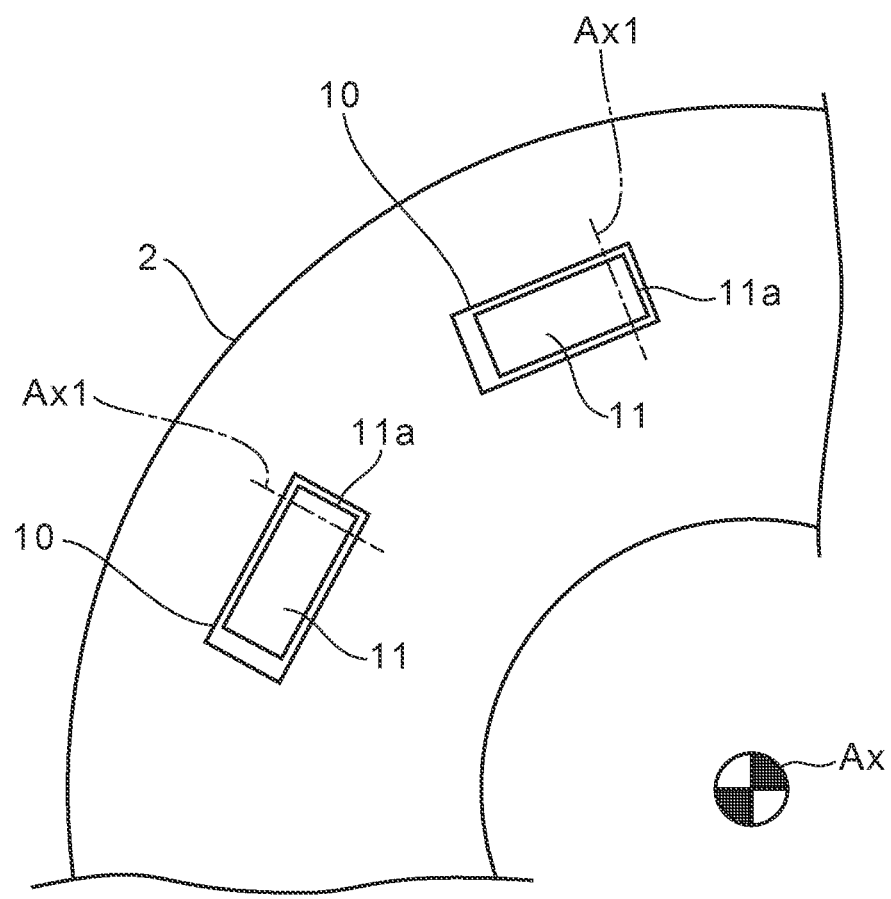
FIG. 4 is a view illustrating part of a holding plate.
Figure 6:
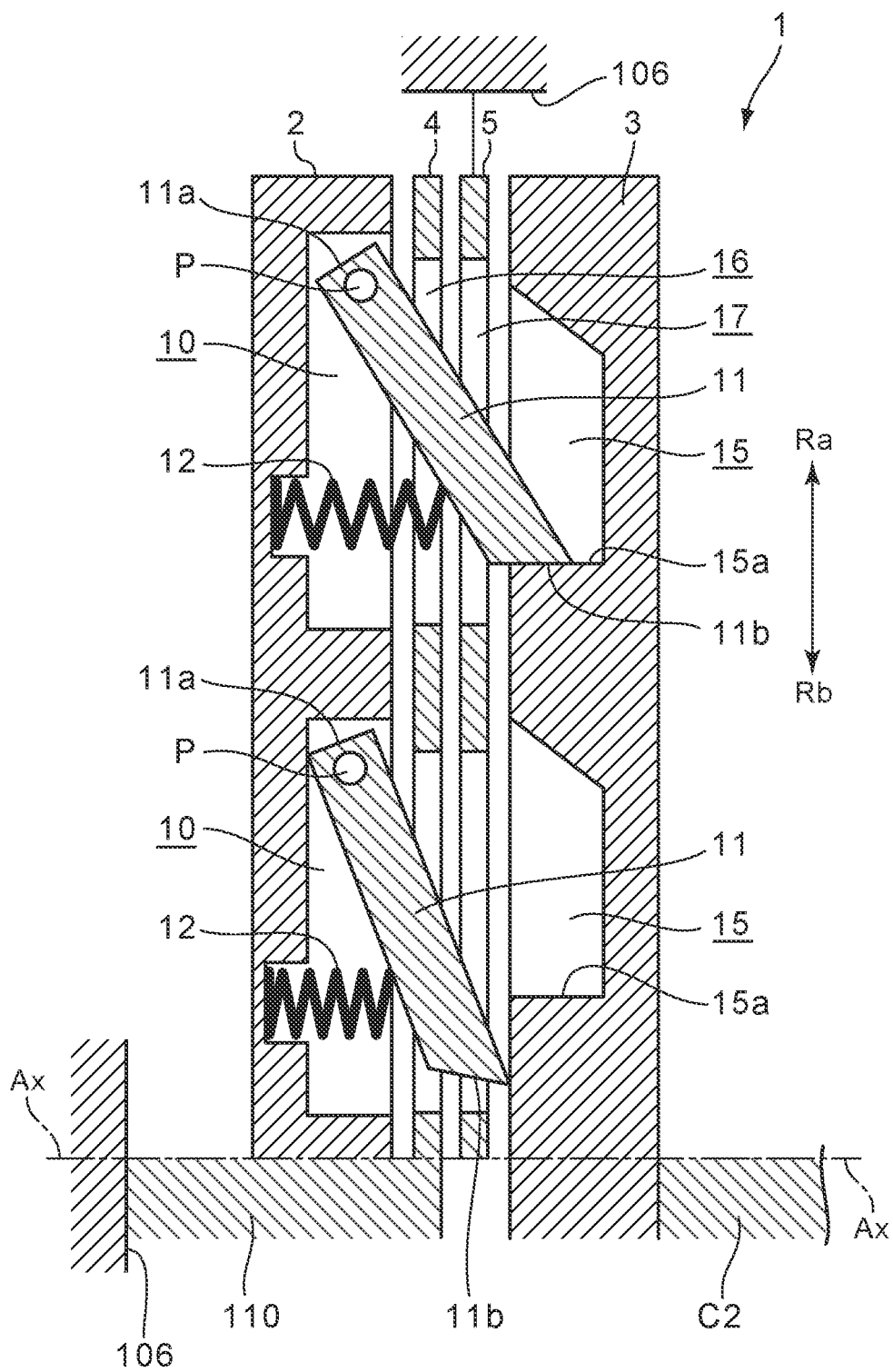
FIG. 6 is a sectional view at the time of a lock mode, taken along a line VI-VI in FIG 2.

As illustrated in FIGS. 2, 4, and 6, in the holding plate 2, a plurality of holding chambers 10 is formed such that the plurality of holding chambers 10 is opened on a side opposed to the rotating plate 3 and arranged in a circumferential direction. Each of the holding chambers 10 is provided with one claw member 11 meshing with the rotating plate 3. A base end 11a of each claw member 11 is attached to the holding plate 2 via a spindle P rotatably around an axis Ax1 extending in a radial direction of the holding plate 2, and is biased by a spring 12 in a projection direction toward a rotating-plate-3 side.

Hereby, each claw member 11 can operate between a state where the each claw member 11 is moved backward toward a holding-plate-2 side and accommodated in the holding chamber 10 and a state where the each claw member 11 projects from the holding plate 2 toward the rotating plate 3. That is, each claw member 11 is provided in the holding plate 2 in a state where the each claw member 11 is projectable.

As illustrated in FIGS. 2 and 6, in the rotating plate 3, a plurality of recessed portions 15 is formed such that the plurality of recessed portions 15 is opened on a side opposed to the holding plate 2 and arranged in the circumferential direction. Each of the recessed portions 15 includes a wall portion 15a with which a tip end 11b of the claw member 11 abuts at the time when the projecting claw member 11 meshes therewith. Although not illustrated herein, the number of recessed portions 15 is larger than the number of claw members 11, and a phase of each recessed portion 15 is different from a phase of each claw member 11 (see FIG. 6). Accordingly, some of the plurality of projecting claw members 11 mesh with some of the plurality of recessed portions 15.

Figure 5:
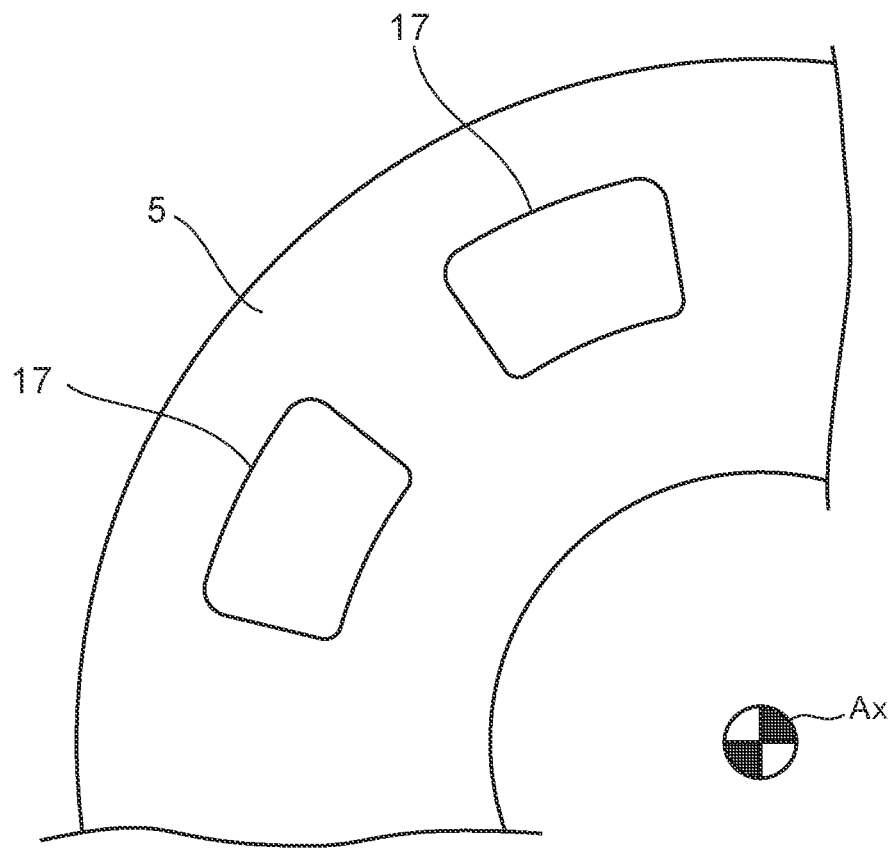
FIG. 5 is a view illustrating part of an additional plate.

In the selector plate 4, a plurality of through holes 16 through which the claw members 11 arranged in the circumferential direction and projecting can be partially passed is formed with the same phases as the claw members 11. Further, the additional plate 5 adjacent to the selector plate 4 and fixed to the case 106 has a plurality of openings 17 through which the claw members 11 arranged in the circumferential direction and projecting as illustrated in FIG. 5 can be passed, and each of the openings 17 of the additional plate 5 is opened at a position corresponding to each of the through holes 16 in a state where the selector plate 4 is placed at a locked position. Accordingly, a range where the rotating plate 3 and the selector plate 4 are prevented by the additional plate 5 from facing each other can be increased to a limit that does not cause any troubles to the operations of the claw members 11. This makes it possible to further reduce an influence of a viscosity of gear oil, which will be described later.

Figure 7:
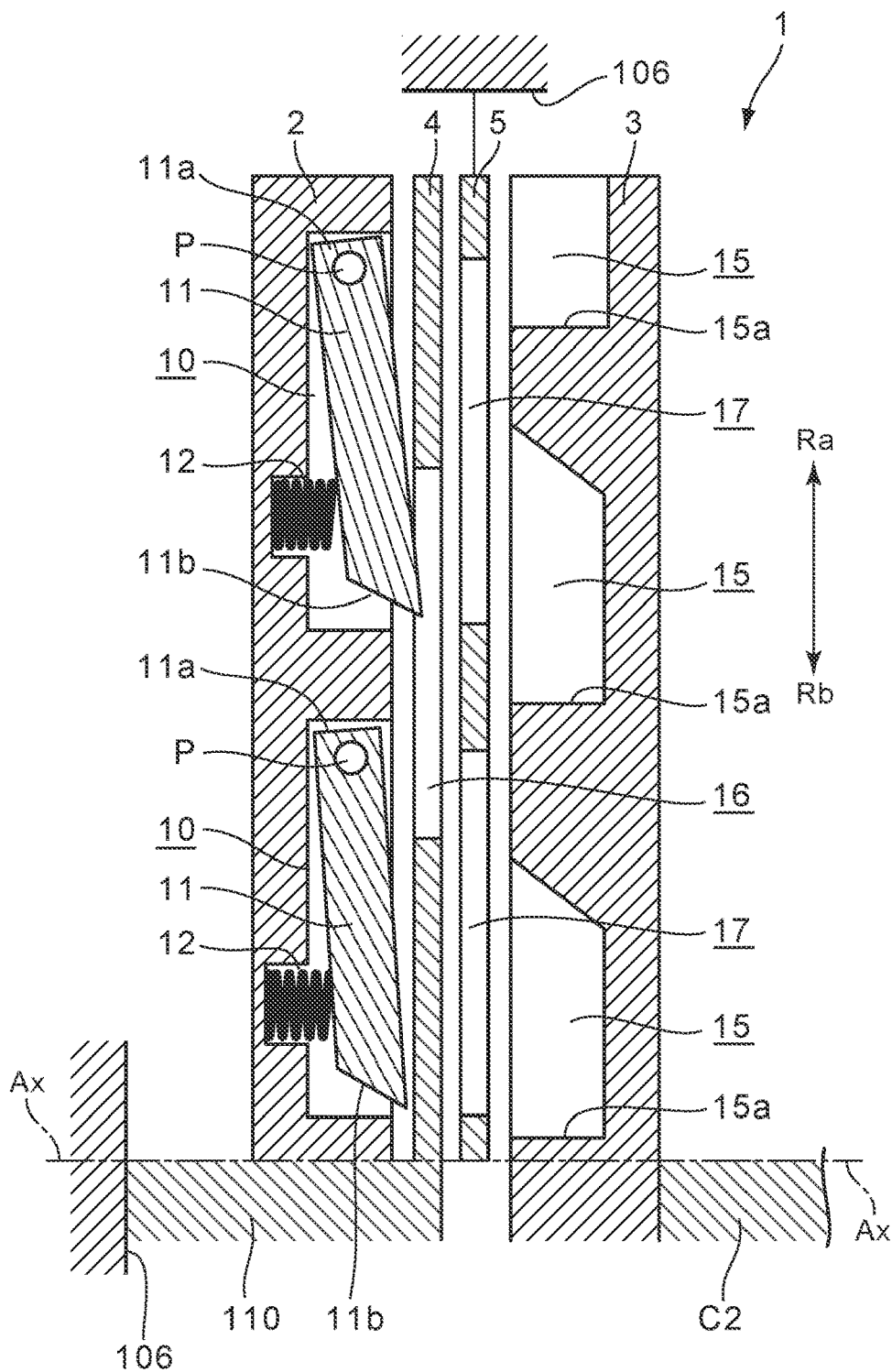
FIG. 7 is a sectional view at the time of a release mode, taken along a line VI-VI line in FIG. 2.

A rotation position of the selector plate 4 can be switched between a locked position in FIG. 6 and a released position in FIG. 7. The locked position is a position at which the claw member 11 passes through the through hole 16 of the selector plate 4 and the opening 17 of the additional plate 5 so that the claw member 11 can mesh with the recessed portion 15 of the rotating plate 3. The released position is a position at which the tip end 11b of the claw member 11 abuts with the selector plate 4 so as to restrict projection of the claw member 11 and maintain the claw member 11 to be accommodated on the holding-plate-2 side. Hereby, the lock mode and the release mode are performed selectively.

As illustrated in FIG. 2, the selector plate 4 is provided with an actuating arm 4a extending in the radial direction. By driving the actuating arm 4a by a driving device 20, a rotation position of the selector plate 4 is switched. The driving device 20 includes an actuator 21, and a transmission mechanism 22 that transmits an operation of the actuator 21 to the actuating arm 4a of the selector plate 4. The actuator 21 includes a main body 23 fixed to the case 106, and a drive rod 24 which can move back and forth relative to the main body 23 and which is linked with the actuating arm 4a. The transmission mechanism 22 includes a guide member 25 fixed to the case 106 so as to guide the drive rod 24 of the actuator 21, a spring seat 26 fixed to the drive rod 24, and a return spring 27 provided between the guide member 25 and the spring seat 26 in a compressed manner.

A state indicated by a continuous line in FIG. 2 is a state where the actuator 21 of the driving device 20 operates so that the drive rod 24 projects from the main body 23 against an elastic force of the return spring 27, so as to switch the selector plate 4 to the locked position. The clutch 1 in this state is in the lock mode descried above. In the meantime, when the actuator 21 of the driving device 20 is switched to a non-operation state from the state indicated by the continuous line in FIG. 2, the drive rod 24 moves backward toward a main-body-23 side due to an elastic force of the return spring 27, so that the actuating arm 4a moves to a position indicated by an alternate long and two short dashes line, so as to switch the selector plate 4 to the released position. Hereby, the clutch 1 is switched to the release mode.

In a case of the lock mode in FIG. 6, at the time when a rotation direction of the rotating plate 3 is Ra, the tip end 11b of the claw member 11 abuts with the wall portion 15a of the recessed portion 15. Accordingly, the claw member 11 meshes with the recessed portion 15 of the rotating plate 3, so that the holding plate 2 is joined to the rotating plate 3, thereby allowing torque transmission therebetween and fixing the carrier C2 to the case 106. In the meantime, at the time when the rotation direction of the rotating plate 3 is Rb, the claw member 11 is inclined toward a direction of Rb. Accordingly, even if the claw member 11 interferes with the recessed portion 15 of the rotating plate 3, the claw member 11 is just pushed back toward the holding-plate-2 side. On that account, the claw member 11 does not mesh with the recessed portion 15. Accordingly, in a case where the clutch 1 is in the lock mode, at the time when the rotation direction of the rotating plate 3 is Rb, torque transmission between the holding plate 2 and the rotating plate 3 is blocked and the rotating plate 3 is released.

In the meantime, in a case of the release mode in FIG. 7, the claw members 11 are maintained to be accommodated on the holding-plate-2 side by the selector plate 4, so that the claw members 11 do not reach the recessed portions 15 of the rotating plate 3. Accordingly, regardless of whether the rotation direction of the rotating plate 3 is either Ra or Rb, torque transmission from the rotating plate 3 to the holding plate 2 is blocked and the rotating plate 3 is released. The state of the release mode of FIG. 7 is maintained by the elastic force of the return spring 27.

The clutch 1 is under an environment in which the clutch 1 is wet by gear oil in the case 106, and the gear oil is provided between respective plates 2, 3, 4, 5. Since the gear oil has viscosity, when the rotating plate 3 rotates, part of its torque is transmitted to the other plates via the gear oil. Accordingly, the clutch 1 is affected by the viscosity of the gear oil.

Figure 8:
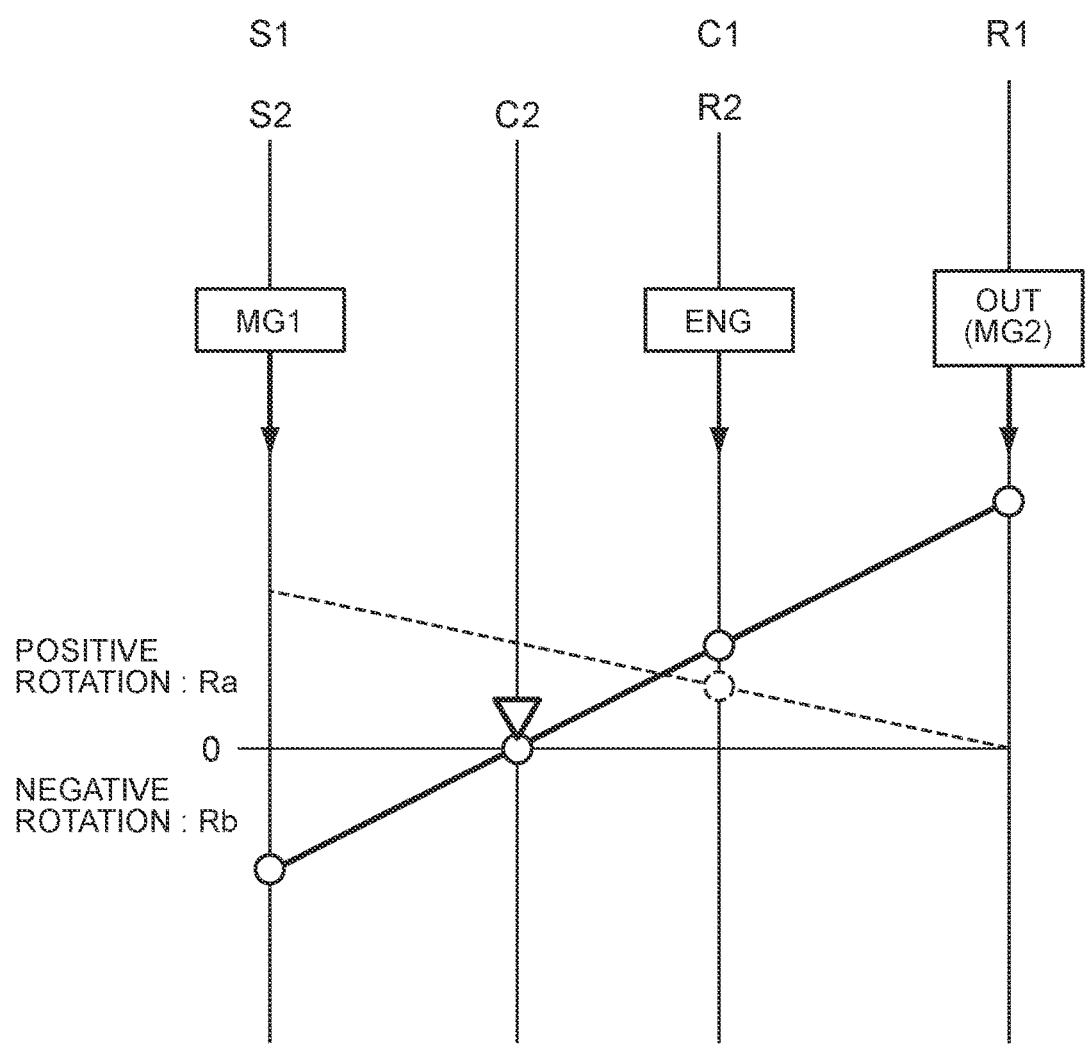
FIG. 8 is a view illustrating a velocity diagram of a power distribution mechanism.

At the time of startup of the internal combustion engine 108, the clutch 1 is maintained in the release mode by the return spring 27. As illustrated by a broken line in FIG. 8, when the internal combustion engine 108 is started in a state where a vehicle stops, the carrier C2 that rotates integrally with the rotating plate 3 rotates forward. On that account, a torque in a direction toward the locked position from the released position acts on the selector plate 4 along with the rotation of the rotating plate 3. Particularly, in a case where the viscosity of the gear oil is high like a first startup of the internal combustion engine 108 in a low temperature environmental, the torque becomes larger as compared with other environments.

When a torque acting on the selector plate 4 exceeds a torque caused due to the elastic force of the return spring 27 in such a situation, such a malfunction may be caused that the selector plate 4 rotates unexpectedly in spite of a non-operation state of the actuator 21 of the driving device 20 and the selector plate 4 is switched to the locked position. Accordingly, in order to restrain the occurrence of such a malfunction in a case of the release mode, it is necessary to employ, as the return spring 27, a spring that causes a torque that can resist a torque that can be transmitted to the selector plate 4 due to the rotation of the rotating plate 3, at the time of the release mode.

In the clutch 1, the additional plate 5 fixed to the case 106 is provided between the rotating plate 3 and the selector plate 4. Accordingly, in comparison with a case where the additional plate 5 is not provided and the rotating plate 3 and the selector plate 4 face each other, a facing area between the rotating plate 3 and the selector plate 4 is reduced by the additional plate 5 in the clutch 1. On that account, it is possible to reduce an influence of the viscosity of the gear oil even under an environment in which the clutch 1 is wet by the gear oil. That is, a torque to be transmitted to the selector plate 4 due to the rotation of the rotating plate 3 is decreased. Hereby, it is possible to restrain the occurrence of the malfunction in a case of the release mode. Besides, it is possible to employ, as the return spring 27, a spring having a small spring coefficient as compared with a case where no additional plate 5 is provided, so it is possible to employ an actuator with a small output as the actuator 21 that operates against the elastic force of the return spring 27. This makes it possible to reduce the energy that causes the actuator 21 to operate.

The embodiment has been described above, but the embodiment is not limited to this, and various embodiments can be performed within the gist of the disclosure. The clutch of the above embodiment is used as a brake which is incorporated into the transaxle TA serving as a power transmission device and which selectively fixes one element of a planet gear mechanism, but this is merely one applicable example. For example, the clutch may be used by being incorporated into an automatic transmission of the power transmission device.

The additional plate 5 of the above embodiment has an advantage that a range where the rotating plate 3 and the selector plate 4 are prevented from facing each other can be increased to a limit that does not cause any troubles to the operations of the claw members 11, but the additional plate 5 is merely one example of an interposition member. The embodiment is also performable by providing interposition members as illustrated in FIGS. 9 to 11 instead of the additional plate 5, for example.

Figure 9:
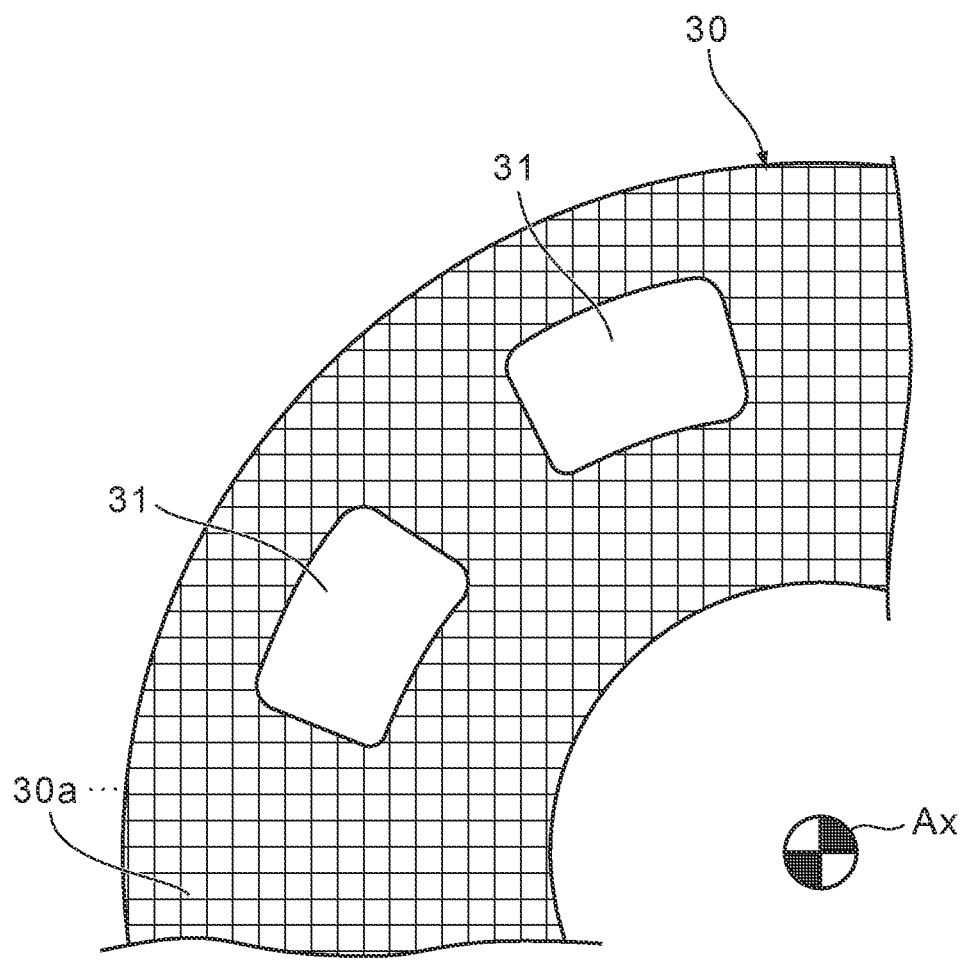
FIG. 9 is a view illustrating part of a mesh-shaped member.

FIG. 9 illustrates part of a mesh-shaped member 30 as the interposition member. The mesh-shaped member 30 is constituted by a mesh-shaped material in which a plurality of penetration portions 30a formed in a rectangular shape is arranged regularly. Similarly to the additional plate 5, the mesh-shaped member 30 has a plurality of openings 31 that allows the claw members 11 to pass therethrough. By placing the mesh-shaped member 30 between the rotating plate 3 and the selector plate 4 in a state where the mesh-shaped member 30 is fixed to the case 106, instead of the additional plate 5, torque transmission from the rotating plate 3 to the selector plate 4 via gear oil is restricted by the mesh-shaped member 30. Accordingly, the mesh-shaped member 30 functions in the same way as the additional plate 5, so that a torque acting on the selector plate 4 along with the rotation of the rotating plate 3 is decreased. This makes it possible to decrease the influence of the viscosity of the gear oil.

Figure 10:
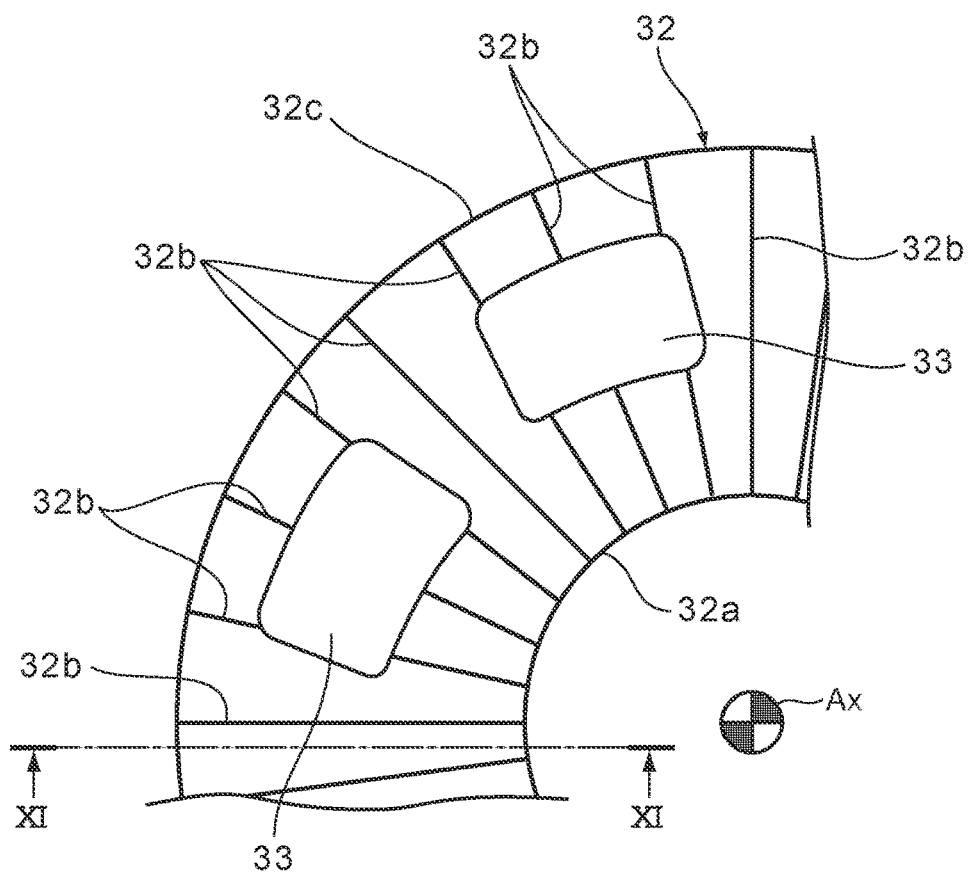
FIG. 10 is a view illustrating part of a wheel-shaped member.
Figure 11:
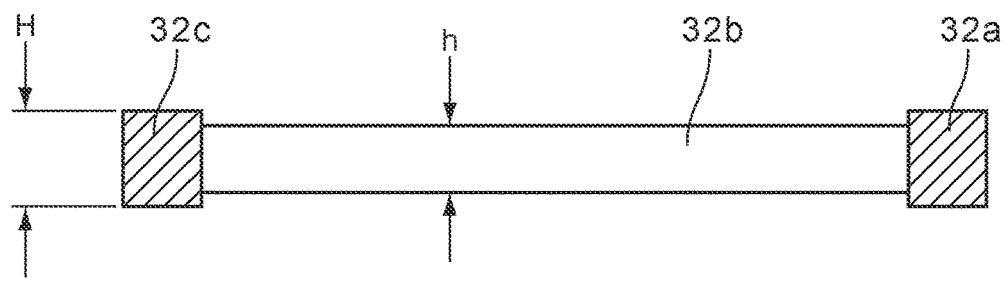
FIG. 11 is a sectional view taken along a line XI-XI in FIG. 10.

FIG. 10 illustrates part of a wheel-shaped member 32 as the interposition member. The wheel-shaped member 32 includes a hub 32a placed in a central part, a plurality of spokes 32b formed into a bar shape extending radially from the hub 32a, and a rim 32c to which tip ends of the spokes 32b are connected. Similarly to the additional plate 5, the wheel-shaped member 32 has a plurality of window portions 33 that allows the claw members 11 to pass therethrough. Each of the window portion 33 is formed in a frame shape so as to divide some of the spokes 32b. By placing the wheel-shaped member 32 between the rotating plate 3 and the selector plate 4 in a state where the wheel-shaped member 32 is fixed to the case 106, instead of the additional plate 5, the spokes 32b extending in the radial direction restrict torque transmission from the rotating plate 3 to the selector plate 4 via gear oil. Accordingly, the wheel-shaped member 32 functions in the same way as the additional plate 5, so that a torque acting on the selector plate 4 along with the rotation of the rotating plate 3 is decreased. This makes it possible to decrease the influence of the viscosity of the gear oil. A sectional shape of each of the spokes 32b may be rectangular or round. Further, as illustrated in FIG. 11, a height h of the spoke 32b in a direction of the axis Ax is preferably closer to a height H of the hub 32a and the rim 32c in the direction of the axis Ax, because the torque transmission by the gear oil is easily restricted.

In each of the embodiments, the additional plate 5, the mesh-shaped member 30, and the wheel member 32 are each formed in a hollow discoid shape, but each of such interposition members can be formed in an unround shapes such as a semicircular shape, a rectangular shape, and the like, for example. Further, the additional plate 5, the mesh-shaped member 30, or the wheel-shaped member 32 is fixed to the case 106 so that its relative rotation to the selector plate 4 is restricted. However, they may not necessarily be fixed completely if a free rotation of the additional plate 5 or the like is restricted.

What is claimed is:

1. A selectable one-way clutch comprising:
    a first plate;
    a second plate placed on the same axis as the first plate;
    a claw provided in the first plate, the claw being configured to project from the first plate toward the second plate, the claw being configured to mesh with a recessed portion disposed in the second plate when the second plate rotates in a predetermined rotation direction and the claw projects from the first plate;
    a selector plate placed so as to be adjacent to the first plate, the selector plate being configured to rotate relative to the first plate between a locked position at which the claw is projectable from the first plate and a released position at which the claw is maintained to be accommodated on a first-plate side; and
    an interposition member placed between the selector plate and the second plate, rotation of the interposition member relative to the selector plate being restricted.

2. The selectable one-way clutch according to claim 1, wherein
    the selector plate has a through hole, the through hole being provided so as to allow the claw to pass through the through hole when the selector plate is placed at the locked position; and
    the interposition member is an additional plate, the additional plate having an opening, the opening being opened at a position corresponding to the through hole such that the claw is allowed to pass through the opening when the selector plate is placed at the locked position.

3. A power transmission device comprising a planet gear mechanism, a selectable one-way clutch and a case, the planet gear mechanism including at least three rotating elements, the selectable one-way clutch including:
    a first plate;
    a second plate placed on the same axis as the first plate;
    a claw provided in the first plate, the claw being configured to project from the first plate toward the second plate, the claw being configured to mesh with a recessed portion disposed in the second plate when the second plate rotates in a predetermined rotation direction and the claw projects from the first plate;
    a selector plate placed so as to be adjacent to the first plate, the selector plate being configured to rotate relative to the first plate between a locked position at which the claw is projectable from the first plate and a released position at which the claw is maintained to be accommodated on a first-plate side; and
    an interposition member placed between the selector plate and the second plate, rotation of the interposition member relative to the selector plate being restricted;
    the case being configured such that gear oil is supplied to inside of the case, the case accommodate the selectable one-way clutch, the first plate is fixed to the case; and the at least one of the three rotating elements of the planet gear mechanism being connected to the second plate such that the at least one of the three rotating elements rotates integrally with the second plate.

\* \* \* \* \*